Dec. 13, 1966        L. J. LOGAN        3,291,438

WELDING FERRULE

Filed April 26, 1961

INVENTOR.
LEWIS J. LOGAN
BY
Woodling, Krost, Granger & Rust
Attys.

United States Patent Office 3,291,438
Patented Dec. 13, 1966

3,291,438
WELDING FERRULE
Lewis J. Logan, 11820 Edgewater Drive,
Lakewood, Ohio
Filed Apr. 26, 1961, Ser. No. 105,611
8 Claims. (Cl. 249—83)

The present invention relates in general to welding and more particularly to a welding ferrule for use in welding a stud or connector member to a body member.

An object of the present invention is to provide a welding ferrule which is exceptionally able to retain molten metal around a stud being welded to a body member while being able to allow for the dissipation of gases resulting from the welding operation.

Another object of the present invention is to provide a welding ferrule which includes first and second bore portions with the second bore portion forming a welding chamber with a stud and with the first bore portion closely surrounding the stud and having means for transmitting gas from the welding chamber in an axial direction adjacent the stud.

Another object of the present invention is to provide a welding ferrule which is of such construction that provision is made for the passage of gases relative to a welding chamber, however, wall means are provided to prevent molten metal from being unevenly distributed and another provision is made for the escape of gas which results because of the wall means.

Another object of the present invention is to provide a welding ferrule which has the ability of maintaining molten metal around a stud which is being welded to a body member and which is particularly useful in this respect when the stud is being welded to a vertical body member.

Another object of the present invention is to provide a welding ferrule which aids in solidifying molten metal into a uniform weld.

Another object of the present invention is to provide a welding ferrule which aids in stabilizing the arc between a stud or connector and the body member to which it is being welded.

Another object of the present invention is to provide a welding ferrule which has surface means for engagement with a body member to which a stud is to be welded which is generally flat and has good engagement with the body member to provide stability in the ferrule as distinguished from ferrules having sharp or pointed engagement surfaces.

Other objects and a fuller understanding of this invention may be had by referring to the following description and claims, taken in conjunction with the accompanying drawing, in which:

Figure 3:
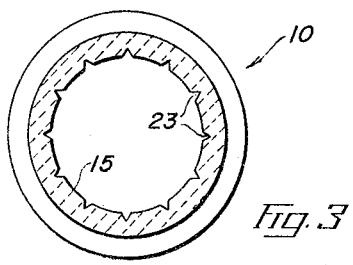
FIGURE 3 is a view taken generally along the line 3—3 of FIGURE 1.
Figure 1:
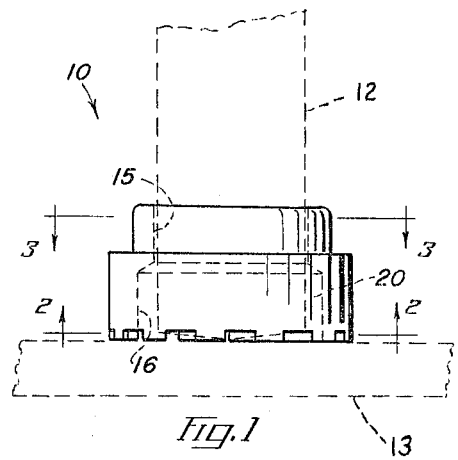
FIGURE 1 is a side elevational view of the welding ferrule of the present invention with the general position of a welding stud shown in dotted lines as well as a body member to which the stud is to be welded.

The welding ferrule of the present invention and as shown in the drawings has been indicated generally by the reference numeral 10 and is adapted to be disposed around the end of a welding stud during the welding of the stud to a body member. The welding stud or connector member has been indicated generally in FIGURE 1 by the dotted lines 12 and the body member to which the welding stud is to be welded has been indicated by the dotted lines 13. The welding operation is carried out by means of a welding gun which holds the welding stud in a manner which is known by those skilled in the art and as a result, the details and construction of the welding gun will not be referred to hereinafter. The welding operation as is known by those skilled in the art is carried out by initiating an arc between the end of the welding stud and the body member to which the stud is to be attached. The electric arc which results transforms a portion of the end of the welding stud into the molten state which subsequently solidifies causing the weld.

The welding ferrule 10 is formed of a refractory or ceramic material which is, comparatively speaking, an inexpensive material of construction and is such that after the welding operation has been completed can be broken if desired by means of a hammer blow or the like. The welding ferrule shown includes in combination an integral refractory member which has wall means which define an axial bore therethrough. The wall means referred to define an upper or first bore portion 15 and a second or lower bore portion 16. As will be noted from the drawings the upper bore portion 15 is of a smaller diameter than the lower bore portion 16. The welding ferrule which has been shown in the drawings has been drawn exactly to scale and the scale is 1½ times actual size. The upper bore portion 15 is designed to closely surround the welding stud 12 as noted with the welding stud extending therethrough. The lower bore portion 16 also surrounds the stud 12, however, the stud is spaced substantially from the lower bore portion and this defines what may be referred to as an annular welding chamber 20. A plurality of circumferentially spaced vents or V-shaped notches 23 are provided in the wall of the upper bore 15 and as will be noted extend axially the entire axial length of the upper bore. These vents or notches provide for venting gas from the welding chamber to the atmosphere when a welding operation is being performed.

Figure 5:
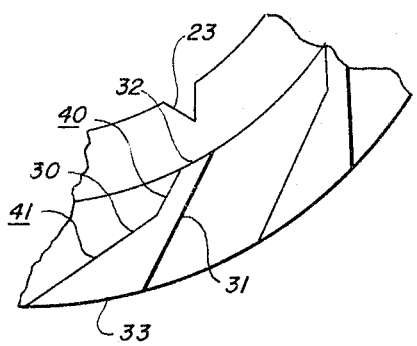
FIGURE 5 is an enlarged fragmentary view of a portion of the welding ferrule taken in a direction similar to the direction of FIGURE 2.
Figure 2:
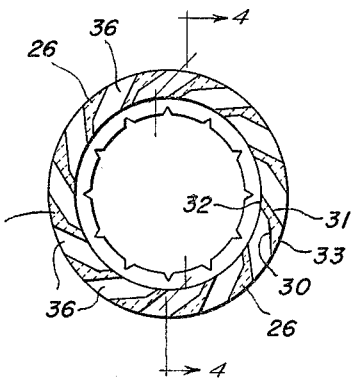
FIGURE 2 is a view taken generally along the line 2—2 of FIGURE 1.
Figure 4:
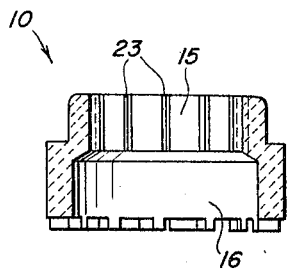
FIGURE 4 is a view taken generally along the line 4—4 of FIGURE 2.

As will be noted from the drawings the bottom edge of the ferrule at the lower end of the lower bore portion is provided with wall means which define a plurality of legs 26 which are adapted for engagement with the body member 13 to which the welding stud 12 is to be attached. Each of these legs as will be noted is circumferentially spaced from the other legs and each of the legs is defined by first and second side walls 30 and 31 respectively and inner and outer end walls 32 and 33 respectively. The first side wall 30 of one leg and the second side wall of the next adjacent leg in the case of all of the legs of the ferrule member, define slots or openings 36 through the wall of the lower bore portion 16. As will be noted these openings or slots 36 extend at an acute angle with respect to a radius line of the lower bore portion. It will be noted that the first side wall 30 (FIGURE 5) is made up of two wall portions indicated by the reference numerals 40 and 41 respectively. The purpose of this construction will be described hereinafter. It will also be observed that the V-shaped notches or vents 23 in the wall of the upper bore portion are located in line with the inner end wall 32 of a corresponding leg 26. In other words, in the embodiment which has been illustrated herein, there are provided 12 V-shaped notches 23 as well as 12 legs 26. In other words, a plane which includes the V-shaped notch will also include the inner end wall 32 which corresponds thereto.

The welding ferrule which has been provided is exceptionally able to retain the molten metal from the welding operation within the welding chamber 20 which is defined by the lower bore portion while still being able to allow for the dissipation of gases from the welding operation. This in a larger measure is because of the construction of the spacing legs 26 on the lower edge of the lower bore portion. As pointed out hereinabove, the legs are constructed in such manner that the slots or openings 36 are formed which extend at an acute angle with respect to a radius line of the lower bore portion. This means that molten metal which originates from the welding operation in order to escape from the lower bore portion must in effect travel around a corner, or in other words, must engage the first side wall 30 of a leg and then be directed in nearly a tangential direction in order to escape from the welding chamber. The molten metal therefore is very well contained within the welding chamber whereas gases developed and resulting because of the welding operation are easily permitted to escape through the slots or openings 36. The inner end walls 32 of the legs 26 may result in some cases in a pressure build-up at these points because of the welding operation and in these instances the pressure build-up is conveniently dissipated out the vents or V-shaped notches 23 which are provided in the wall or upper bore 13. It will be readily appreciated that the V-shaped notches 23 provide for the escape of some gases in most welding operations. The ability of the present welding ferrule to maintain molten metal around the end of the welding stud is very readily observed when the welding stud is being welded to a vertical member. In these cases, gravity is acting to cause the molten metal to leave the welding chamber. The fact that the slots or openings 36 are on an angle with respect to a radius line causes the molten metal to engage the first side wall 30 and the engagement of the molten metal tends to act as a precipitator for the molten metal causing it to harden more readily. The action of the escape of the gases and the high and low pressure areas within the welding ferrule tends to create what is believed to be a generally tangential escape of gases which causes a rotating effect which in turn is believed to aid in stabilizing the welding arc. The use of the design in the legs 26 also provides a relatively large surface area for engagement with the body member 13, giving a good stability to the welding ferrule 10, particularly as distinguished from those type of ferrules which have sharp or pointed surface for engagement with the body member.

Although this invention has been described in its preferred form with a certain degree of particularly, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A ferrule for disposition around the end of a welding stud including in combination an integral ceramic member having wall means defining an axial bore therethrough, said wall means defining upper and lower generally cylindrical bore portions, said upper bore portion being of a smaller diameter than said lower bore portion, said upper bore portion being of a diameter to surround a welding stud extending therethrough, said lower bore portion adapted to surround a welding stud and being spaced therefrom to define an annular welding chamber, a plurality of circumferentially spaced V-shaped notches in the wall of said upper bore extending the length of said upper bore to provide vents to the atmosphere from said welding chamber, wall means defining a plurality of legs on the bottom edge of said ceramic member and adapted for engagement with a body member to which a welding stud is to be attached, each of said legs being circumferentially spaced from each other, each said leg being defined by first and second side walls and inner and outer end walls, said first side wall of one leg and said second side wall of the next adjacent leg defining an opening through the wall of said lower bore portion, each said opening extending at an angle with respect to all radii lines extending through said opening, whereby substantially all radii extending through said opening will impinge against a first wall of said opening, said V-shaped notches in said wall of said upper bore portion being in line with said inner wall of a corresponding leg.

2. A ferrule for disposition around the end of a welding stud including in combination a refractory member having wall means defining an axial bore therethrough, said wall means defining upper and lower bore portions, said upper bore portion being of a smaller diameter than said lower bore portion, said upper bore portion being of a diameter to surround a welding stud extending therethrough, said lower bore portion adapted to surround a welding stud and being spaced therefrom to define an annular welding chamber, a plurality of circumferentially spaced notches in the wall of said upper bore extending the length of said upper bore to provide vents to the atmosphere from said welding chamber, wall means defining a plurality of legs on the bottom edge of said refractory member and adapted for engagement with a body member to which a welding stud is to be attached, each of said legs being circumferentially spaced from each other, each said leg being defined by first and second side walls and inner and outer end walls, said first side wall of one leg and said second side wall of the next adjacent leg defining an opening through the wall of said lower bore portion, each said opening extending at an angle with respect to all radii lines extending through said opening, whereby substantially all radii extending through said opening will impinge against a first wall of said opening, said notches in said wall of said upper bore portion being in line with said inner wall of a corresponding leg.

3. A ferrule for disposition around the end of a welding stud including in combination a ceramic member having wall means defining a bore therethrough, said wall means defining upper and lower generally cylindrical bore portions, said upper bore portion being of a diameter to surround a welding stud extending therethrough, said lower bore portion adapted to surround a welding stud and being spaced therefrom to define an annular welding chamber, wall means defining a plurality of legs on the bottom edge of said member and adapted for engagement with a body member to which a welding stud is to be attached, each of said legs being circumferentially spaced from each other, each said leg being defined by first and second side walls, said first side wall of one leg and said second side wall of the next adjacent leg defining an opening through the wall of said lower bore portion, each said opening extending at an angle with respect to all radii lines extending through said opening, whereby substantially all radii extending through said opening will impinge against a first wall of said opening.

4. A welding ferrule including in combination a member having wall means defining a bore therethrough, wall means defining a plurality of legs on the bottom edge of said member, each of said legs being circumferentially spaced from each other, each said leg being defined by first and second side walls, said first side wall of one leg and said second side wall of the next adjacent leg defining an opening through the wall of said bore, each said opening extending at an angle with respect to all radii lines extending through said opening, whereby substantially all radii extending through said opening will impinge against a first wall of said opening.

5. A ferrule for disposition around the end of a welding stud including in combination a member having wall means defining a bore therethrough, said wall means defining upper and lower bore portions, said upper bore portion being of a diameter to surround a welding stud extending therethrough, said lower bore portion adapted to surround a welding stud and being spaced therefrom to define an annular welding chamber, wall means defining a plurality of legs on the bottom edge of said member and adapted for engagement with a body member to which a welding stud is to be attached, each of said legs being circumferentially spaced from each other, each said leg being defined by first and second side walls and inner and outer walls, said first side wall of one leg and said second side wall of the next adjacent leg defining openings through the wall of said lower bore portion, said openings extending at a substantially large angle with respect to a radius line of said lower bore portion, said first side wall having first and second wall portions, said first wall portion being located adjacent said chamber ano extending at an angle with respect to said radius line, said second wall portion being connected to said first wall portion and also extending at an angle with respect to said radius line which larger than said angle of said first wall portion, said first side walls and said inner walls being so positioned as a result of said above construction that substantially all radii lines intersect said first side walls and said inner walls.

6. A ferrule for disposition around the end of a welding stud including in combination a member having wall means defining a bore therethrough, said wall means defining upper and lower bore portions, said upper bore portion being of a diameter to surround a welding stud extending therethrough, said lower bore portion adapted to surround a welding stud and being spaced therefrom to define an annular welding chamber, wall means defining a plurality of openings in said lower bore portion, each of said openings being circumferentially spaced from and closely adjacent each other, said openings extending at a substantially large angle with respect to a radius line of said lower bore portion, said wall means of said openings being so positioned as a result of said above construction that substantially all radii lines intersect said wall means.

7. A welding ferrule including in combination a member having wall means defining a bore therethrough, wall means defining a plurality of legs on the bottom edge of said member, each of said legs being circumferentially spaced from each other, each said leg being defined by first and second side walls, said first side wall of one leg and said second side wall of the next adjacent leg defining an opening through the wall of said bore, each said opening extending at an angle with respect to all radii lines extending through said opening, whereby substantially all radii extending through said opening will impinge against a first wall of said opening, said side walls obstructing the direct radial escape of gas and molten metal originating in the central portion of said bore whereby exit of gas and molten metal is in a direction which is at an angle with respect to said radius line and approaching a tangent to said bore.

8. A welding ferrule including in combination a member having wall means defining a bore therethrough, wall means defining a plurality of openings through said wall means which define said bore, said openings being circumferentially spaced from each other, each said opening extending at an angle with respect to all radii lines extending through said opening, whereby substantially all radii extending through said opening will impinge against a first wall of said opening, said wall means of said openings obstructing the direct radial escape of gas and molten metal originating in the central portion of said bore whereby exit of gas and molten metal is in a direction which is at an angle with respect to said radius line and approaching a tangent to said bore.

References Cited by the Examiner

UNITED STATES PATENTS

| | | | |
|---|---|---|---|
| 2,727,971 | 12/1955 | Mowry | 219—136 |
| 2,788,435 | 4/1957 | Maras | 219—136 |
| 2,847,958 | 8/1958 | Norton et al. | 29—491 X |
| 2,873,354 | 2/1959 | Shoup | 29—484 X |
| 2,878,363 | 3/1959 | Shoup et al. | 219—99 |

FOREIGN PATENTS

| | | |
|---|---|---|
| 518,689 | 11/1955 | Canada. |
| 440,747 | 1/1936 | Great Britain. |
| 601,459 | 5/1948 | Great Britain. |
| 649,177 | 1/1951 | Great Britain. |
| 794,457 | 5/1958 | Great Britain. |

CHARLIE J. MOON, *Primary Examiner.*

CHARLES W. LANHAM, *Examiner.*

D. L. OTTO, M. L. FAGIUS, *Assistant Examiners.*